United States Patent [19]

Burkhardt et al.

[11] 4,399,358

[45] Aug. 16, 1983

[54] PHOTOELECTRIC DIGITAL MEASURING INSTRUMENT HAVING MULTIPLE LIGHT SOURCES

[75] Inventors: Horst Burkhardt, Truchtlaching; Hans-Rudolf Kober, Traunreut, both of Fed. Rep. of Germany

[73] Assignee: Dr. Johannes Heidenhain GmbH, Traunreut, Fed. Rep. of Germany

[21] Appl. No.: 201,039

[22] Filed: Oct. 27, 1980

[30] Foreign Application Priority Data

Nov. 2, 1979 [DE] Fed. Rep. of Germany ....... 2977162

[51] Int. Cl.[3] .................... H01J 40/14; F21V 19/04
[52] U.S. Cl. .................. 250/237 G; 315/88; 362/20; 362/339; 356/375
[58] Field of Search .............. 250/231 R, 237 G; 362/20, 339; 315/88; 356/374, 375

[56] References Cited

U.S. PATENT DOCUMENTS

| 2,557,531 | 6/1951 | Blanchet | 362/20 X |
| 3,577,173 | 5/1971 | Blomgren | 362/20 X |
| 3,678,286 | 7/1972 | Willis | 315/88 X |
| 4,061,911 | 12/1977 | Krasin | 362/20 |
| 4,078,173 | 3/1978 | Fultz | 250/237 G |

FOREIGN PATENT DOCUMENTS 1915478 10/1969 Fed. Rep. of Germany.
1955878 5/1971 Fed. Rep. of Germany.
2144835 5/1973 Fed. Rep. of Germany.

Primary Examiner—David C. Nelms
Assistant Examiner—Edward P. Westin
Attorney, Agent, or Firm—Hume, Clement, Brinks, Willian & Olds, Ltd.

[57] ABSTRACT

A photoelectric measuring apparatus includes a measuring scale and a scanning unit including at least one photosensitive element for generating a scanning signal in response to light incident on the scanned region of the scale. First and second light sources are included, as well as a mechanism for selecting either of the first and second light sources such that light from the selected light sources is directed at the scanned region of the scale. A slider mechanism, a turntable, a movable mirror, or a movable prism can be used to select either the first or second light sources. In addition, a circuit is disclosed which provides separate first and second balancing circuits for the respective light sources, such that rebalancing the measuring instrument is not required when the selecting mechanism is used to select a different light source.

2 Claims, 6 Drawing Figures

PHOTOELECTRIC DIGITAL MEASURING INSTRUMENT HAVING MULTIPLE LIGHT SOURCES

BACKGROUND OF THE INVENTION

This invention relates to improvements in photoelectric, digital, length or angle measuring instruments, and in particular to improved lighting arrangements for such instruments.

A wide range of photoelectric length and angle measuring instruments are known in the prior art. See, for example, West German OS No. 1 955 878, West German OS No. 1 915 478, and West German Pat. No. 2 144 835. In such measuring instruments, the movement of a first object with respect to a second object is measured by measuring the modulation of a light beam which passes through grids having alternating translucent and opaque or reflecting and non-reflecting sections as the grids are moved with respect to one another.

In such prior art instruments, the measurement is interrupted when the light beam is disturbed, for example, when the light source fails to operate. In order to resume measurement, the light source (commonly an incandescent lamp or a light emitting diode) must be replaced and the photoelectric measuring instrument must be rebalanced for the new light source. During the down-time caused by this servicing, no measurements can be made. When, as is often the case, the measuring instrument is mounted to a machine tool, the operation of the machine tool is interrupted for the entire period during which the measuring instrument is being serviced.

SUMMARY OF THE INVENTION

The present invention is directed to an improved lighting arrangement for photoelectric measuring instruments, which reduces the down-time of the measuring instrument occasioned by the failure of a light source. Preferred embodiments of this invention provide a measuring instrument in which a failed light source can be replaced promptly without any substantial interruption of the operation of the measuring instrument.

According to this invention, a photoelectric measuring apparatus is provided which includes a measuring scale and a scanning unit which includes at least one photosensitive element for generating a scanning signal in response to light incident on the scale in a scanned region. In addition, first and second light sources are provided, as well as means for selecting either of the first and second light sources such that light from the selected light sources is directed at the scanned region of the scale. Further features of specific embodiments of the present invention are defined in the dependent claims.

The invention itself, together with further objects and attendant advantages, will best be understood by reference to the following detailed description taken in connection with the accompanying drawings.

DETAILED DESCRIPTION OF THE PREFERRED EMBODIMENTS

Figure 1:
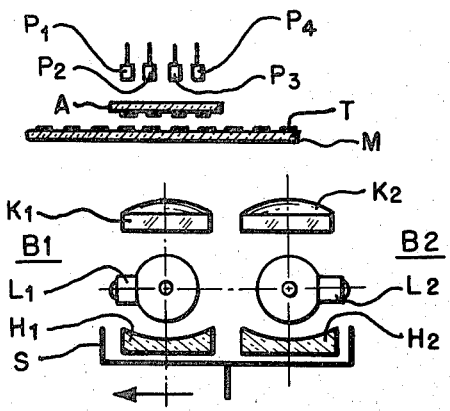
FIG. 1 shows a first preferred embodiment including two illuminating units mounted on a slider mechanism.

Referring now to the drawings, FIG. 1 shows relevant portions of a first preferred embodiment of the invention, which includes a scanning unit and a measuring scale M. In this first embodiment, the scanning unit includes a scanning grid A, four photosenstive elements $P_1$, $P_2$, $P_3$, $P_4$, and two complete illuminating units $B_1$ and $B_2$. Both of the illuminating units $B_1,B_2$ are rigidly mounted to a slider mechanism S. Each of the illuminating units $B_1,B_2$ includes a respective light source $L_1,L_2$, a respective concave mirror $H_1,H_2$, as well as a respective condenser lens $K_1,K_2$. Thus, each of the illuminating units $B_1,B_2$ consists of three elements: a light source $L_1,L_2$; a focusing mirror $H_1,H_2$; and a condenser lens $K_1,K_2$, mounted as a rigid unit. The two illuminating units $B_1,B_2$ are firmly mounted on the slider mechanism S, which is movable such that either one of the two illuminating units $B_1,B_2$ can be brought into the correct position for scanning. In this correct position for scanning, light from the appropriate light source $L_1,L_2$ is directed at the scanned region of the the scale M.

The scale M of the embodiment of FIG. 1 is provided with a periodic grid made up of division tracks $T_1$ ... $T_n$, and is scanned with the aid of the scanning grid A. As explained above, a selected one of the two illuminating units $B_1,B_2$ illuminates the scanned region of the measuring scale M such that the scanning grid A lies in the path of the illumination. As the scanning grid A translates with respect to the measuring scale M, the light beam passing through the scanning grid A and the scale M is modulated. This modulated light beam is converted by photosensitive elements $P_1,P_2,P_3,P_4$ into scanning signals which are amplified and digitized in a manner known to those skilled in the art. By counting pulses obtained from the scanning signals, the relative motion between the measuring scale M and the scanning grid A can be determined. For example, the measuring scale M and scanning grid A can be mounted on the tool slide piece and the bed of a machine tool, respectively.

Figure 2:
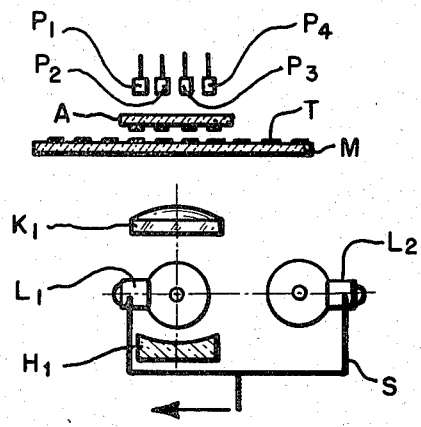
FIG. 2 shows a second preferred embodiment which includes two light sources mounted on a slider mechanism.

FIG. 2 shows a second preferred embodiment in which two light sources $L_1,L_2$ are arranged on a slider mechanism S. These light sources $L_1,L_2$ can be, for example, incandescent lamps or light emitting diodes. A single concave mirror $H_1$ and a single condenser lens $K_1$ are mounted in a fixed position with respect to the scanning grid A. The mirror $H_1$ and the condenser lens $K_1$ are positioned to direct light from the appropriate light source $L_1,L_2$ to the scanned region of the measuring scale M. By means of the slider mechanism S, either one of the two light sources $L_1,L_2$ can be brought into the correct scanning position, such that light from the selected light source $L_1, L_2$ is directed by the mirror $H_1$ and the condenser $K_1$ toward the scanned region of the scale M. In this manner a movable arrangement with two complete illuminating units, such as shown in FIG. 1, can be eliminated.

Figure 3:
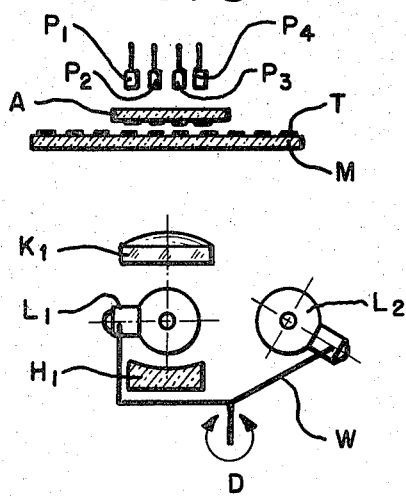
FIG. 3 shows a third preferred embodiment of the invention in which two light sources are mounted on a turntable.

FIG. 3 shows a third preferred embodiment of the present invention which is in some ways similar to the embodiment of FIG. 2. In FIG. 3, the two light sources $L_1, L_2$ are both mounted to a turntable W which is rotatable about a pivot axis D. By correctly positioning the turntable W into one of two preselected positions, either one of the two light sources $L_1, L_2$ can be brought into the correct scanning position to illuminate the scanned region of the scale M. The embodiment of FIG. 3 is particularly useful in connection with angle measuring instruments.

Figure 4:
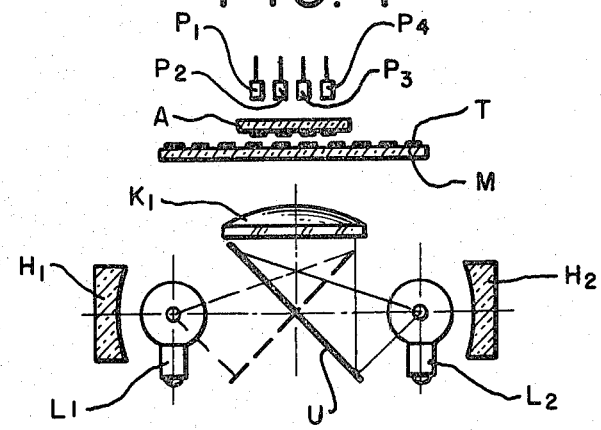
FIG. 4 shows a fourth preferred embodiment of the invention which includes two light sources fixedly mounted with respect to a scanning unit and a movable deflecting mirror.

In the fourth preferred embodiment shown in FIG. 4, two light sources $L_1, L_2$ are mounted in fixed positions with respect to the scanning grid A. In addition, two fixedly mounted concave mirrors $H_1, H_2$ and a fixedly mounted condenser lens $K_1$ are also provided. A swingably mounted deflecting mirror U is provided to conduct light from a selected one of the light sources $L_1, L_2$ to the condenser lens $K_1$ and onto the measuring scale M. This deflecting mirror U is movable between a first position, in which light from the first lamp $L_1$ is directed to the scanned region of the scale M, and a second position, in which light from the second lamp $L_2$ is directed to the scanned region of the scale M. Thus, by moving the mirror U appropriately, light from either of the two lamps $L_1, L_2$ can be directed to the scanned region of the measuring scale M.

Figure 5:
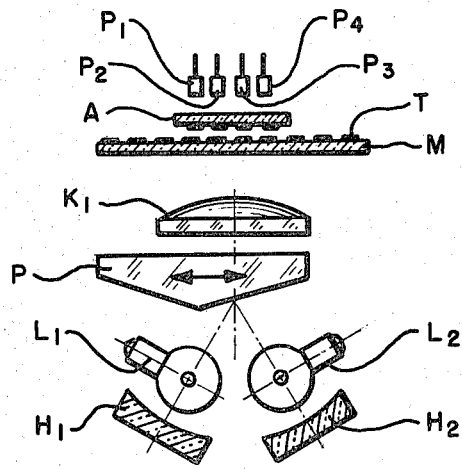
FIG. 5 shows a fifth preferred embodiment of the invention including two light sources fixedly mounted with respect to a scanning unit and a movable shifting prism.

FIG. 5 shows a fifth preferred embodiment which includes two fixedly mounted light sources $L_1, L_2$, two fixedly mounted concave mirrors $H_1, H_2$, and a fixedly mounted condenser lens $K_1$. As shown in FIG. 5, each of the concave mirrors $H_1, H_2$ is associated with a respective one of the two light sources $L_1, L_2$. This fifth preferred embodiment includes a shiftable prism P which is slidably arranged such that the prism moves between a first position (as shown in FIG. 5) and a second position (not shown). In the first position (as shown in FIG. 5), light from the light source $L_2$ is directed by the prism P to the scanned region of the measuring scale M. By merely sliding the prism P into the second position, light from the light source $L_1$ can be selected for illumination of the scale M.

It also lies within the scope of the present invention to conduct illuminating light onto the measuring scale from fixed light sources with the aid of flexible photoconducting fibers.

Figure 6:
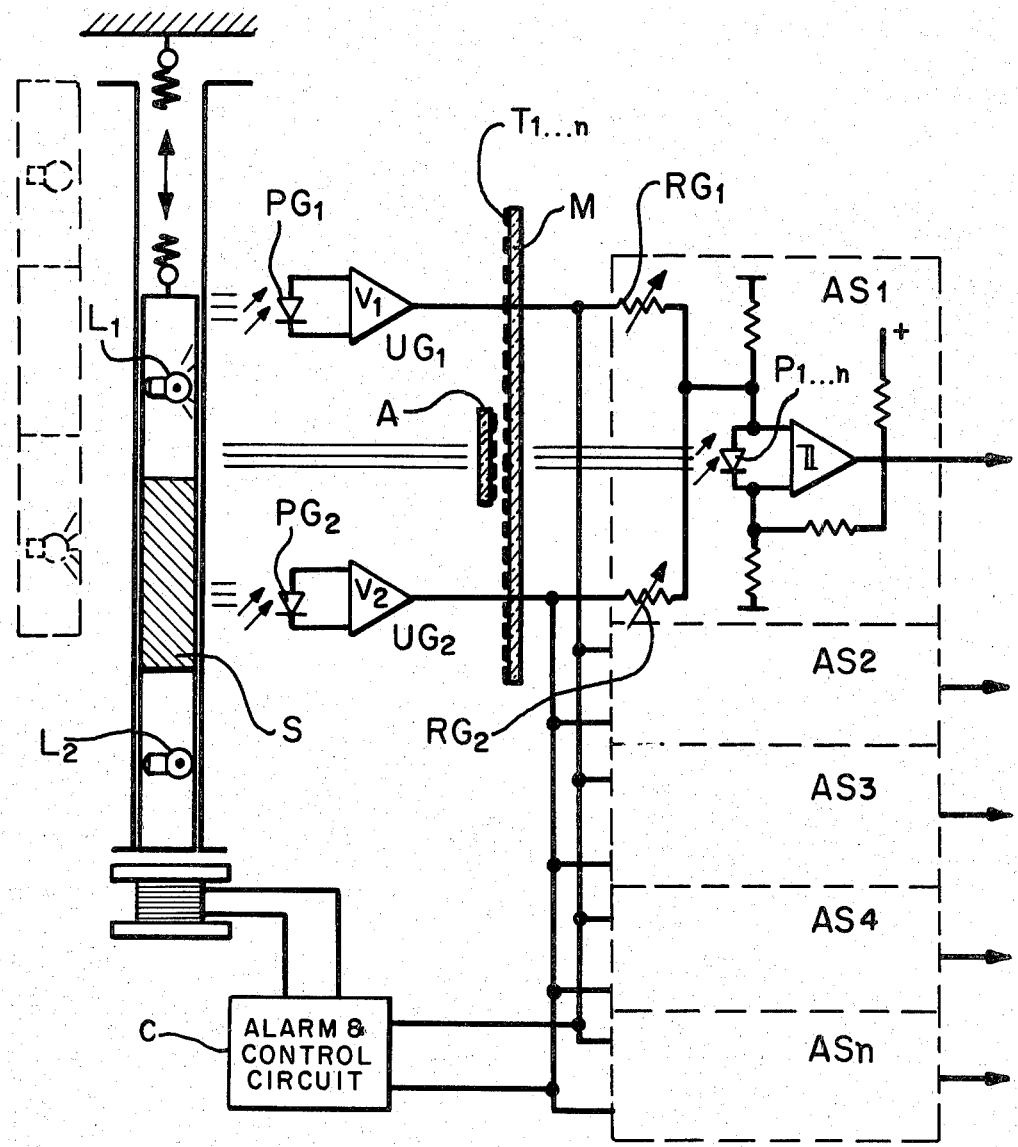
FIG. 6 shows a schematic drawing of a light source shifting apparatus and a schematic drawing of a light beam balancing circuit for each of two light sources.

FIG. 6 provides a schematic drawing of a particularly advantageous embodiment of the invention in which each light source $L_1, L_2$ provided for the illumination of the measuring scale M is provided with a separate balancing branch. In the circuit of FIG. 6, each of the individual light sources $L_1, L_2$ is balanced when the two light sources $L_1, L_2$ are first put into operation. This balancing is preserved until the lamps are replaced. In each case, only a single light source is in operation at any one time, and the balance branch associated with the lamp not in operation does not interfere with the proper operation of the balance branch corresponding to the light source in operation. Each balance branch includes a photosenstive element $PG_1$, $PG_2$, respectively. These photosensitive elements $PG_1, PG_2$ are illuminated by the light sources $L_1, L_2$, respectively, when the respective light sources $L_1, L_2$ are in operation. Preferably, means are provided to ensure that only one of the light sources $L_1, L_2$ is in operation at any given time. Each of the photosensitive elements $PG_1, PG_2$ generates a DC voltage corresponding to the brightness of the respective light source $L_1, L_2$, which voltage is amplified in an amplifier $V_1, V_2$, respectively, and is balanced with the aid of an adjustable resistor $RG_1, RG_2$, respectively, to generate a bias voltage. This bias voltage is then applied to both the respective photosensitive element $P_1 \ldots P_n$ and the associated squaring amplifier as shown in the drawing. This takes place in the evaluating circuits which are provided for each division track $T_1 \ldots T_n$.

Means can be provided for automatically switching from a first light source to a second light source upon the failure of the first light source. Those skilled in the art are familiar with means for accomplishing such automatic switching, and accordingly it is not necessary to describe such switching means in detail here. Electronic, electromagnetic, and thermal means can be provided.

It is especially advantageous to use an alarm device such as circuit C which signals the user of the measuring instrument when one of the light sources has failed, for example, by illuminating a lamp (not shown). The user then, when routine machine inspection and servicing are scheduled, can install a new light source and recalibrate the respective balance branch.

Of course, it should be understood that various changes and modifications can be made to the preferred embodiments described above without departing from the spirit and scope of the present invention. For example, more than two light sources can be used, if desirable. The preferred embodiments described above are intended to be illustrative rather than limiting, and the scope of the present invention is defined by the appended claims, including all equivalents, rather than the particular embodiments described above.

We claim:

1. A photoelectric length or angle measuring apparatus comprising:
    a measuring scale;
    a scanning unit including at least one photosensitive element for generating a scanning signal in response to light incident on a scanned region of the scale;
    a first light source;
    a second light source; and
    means for selecting either of the first and second light sources such that light from the selected light source is directed at the scanned region of the scale;
    wherein the selecting means comprises a shiftable prism, the first and second light sources are fixedly mounted with respect to the scanning unit, and the prism is shiftable between a first position, in which light from the first light source is directed by the prism at the scanned region of the scale, and a second position, in which light from the second light source is directed by the prism at the scanned region of the scale.

2. The invention of claim 1 further comprising means for generating an alarm signal when one of the first and second light sources fails to operate.

* * * * *